United States Patent
Rigosu, Jr. et al.

(10) Patent No.: US 9,966,820 B2
(45) Date of Patent: May 8, 2018

(54) METHOD OF RESTORING HIGH VOLTAGE BUSHING CONNECTION

(71) Applicant: AGT SERVICES, INC., Amsterdam, NY (US)

(72) Inventors: Vincent Rigosu, Jr., Schenectady, NY (US); Michael Bresney, Altamont, NY (US); Nick Rebich, Grove City, OH (US); Charles Marino, Sloansville, NY (US); Randy Snyder, Gloversville, NY (US)

(73) Assignee: AGT Services, Inc., Amsterdam, NY (US)

( * ) Notice: Subject to any disclaimer, the term of this patent is extended or adjusted under 35 U.S.C. 154(b) by 504 days.

(21) Appl. No.: 14/189,355

(22) Filed: Feb. 25, 2014

(65) Prior Publication Data

US 2015/0097452 A1  Apr. 9, 2015

Related U.S. Application Data

(60) Provisional application No. 61/888,755, filed on Oct. 9, 2013.

(51) Int. Cl.
| | |
|---|---|
| *H01R 43/20* | (2006.01) |
| *H02K 15/00* | (2006.01) |
| *H01R 13/53* | (2006.01) |
| *H01R 43/00* | (2006.01) |
| *H02K 5/22* | (2006.01) |

(52) U.S. Cl.
CPC ............. *H02K 15/00* (2013.01); *H01R 13/53* (2013.01); *H01R 43/002* (2013.01); *H02K 5/225* (2013.01); *Y10T 29/49004* (2015.01); *Y10T 29/49208* (2015.01)

(58) Field of Classification Search
CPC . Y10T 29/4968; Y10T 29/49208; H02K 5/04; H02K 5/225
USPC ...... 29/876, 402.07, 402.08, 402.16, 402.18, 29/559, 593, 596, 598, 889.1; 310/54, 310/60 A, 71, 216.114
See application file for complete search history.

(56) References Cited

U.S. PATENT DOCUMENTS

| | | | | |
|---|---|---|---|---|
| 7,287,382 | B2 * | 10/2007 | Henriquez ................ | F23R 3/44 431/181 |
| 7,845,076 | B2 * | 12/2010 | Beckford ............... | H02K 3/487 29/402.08 |

* cited by examiner

*Primary Examiner* — Thiem Phan
(74) *Attorney, Agent, or Firm* — Burr & Brown, PLLC

(57) ABSTRACT

A method of maintaining a high voltage bushing can comprise inspecting a high voltage bushing connection, the high voltage bushing connection comprising a tubular lead, a lower stud connector, and the high voltage bushing. A method of maintaining a high voltage bushing can also comprise restoring the high voltage bushing connection, which can further comprise applying conductive material to at least one of a mating portion of a tubular lead and a mating portion of a high voltage bushing, machining an outside diameter of at least one of the mating portion or the tubular lead and the mating portion of the high voltage bushing to a predetermined outer diameter, and machining a mating portion of a lower stud connector to a predetermined inner diameter. A high voltage bushing connection can comprise a restored mating portion of a tubular connector and a restored lower stud connector.

20 Claims, 6 Drawing Sheets

METHOD OF RESTORING HIGH VOLTAGE BUSHING CONNECTION

FIELD OF THE INVENTION

This invention relates generally to an electrical connection, and more particularly, to a connection between a tubular lead and a high voltage bushing, and a method of maintaining the connection.

BACKGROUND OF THE INVENTION

A high voltage bushing ("HVB") can be used to conduct electric current from a stator winding connection of a generator through the generator frame to a buss external to the generator. In a gas-cooled generator (e.g., a hydrogen-cooled generator), the HVB isolates voltage from the generator frame and provides a gas tight connection. On higher rated generators, direct gas-cooled HVBs are used along with other electrical conductors and/or components to transmit the electric current from the winding to the external buss. In these generators, cooling gas flows through a hollow HVB conductor and a hollow tubular lead. Physical and/or electrical degradation of these and other electrical components can occur due to heat, vibration, or other factors, many of which occur during the course of normal use and aging. Degradation and/or failure of the electrical components can lead to overheating of the HVB, causing degradation and/or failure of the HVB. HVB degradation and/or failure can include, but is not limited to, degradation and/or failure of gas seal(s)/gaskets within the HVB which causes the HVB to leak hydrogen and/or corona resistant filler (e.g., asphalt), aging of the HVB flange bond, and electrical degradation and/or failure. HVB degradation and/or failure can necessitate HVB maintenance, repair, or replacement.

Routine inspections and maintenance can be scheduled, during which the need to repair or replace an HVB can be detected. Leaking asphalt is one possible indicator of a failing HVB. Asphalt can be used to fill air space in the HVB connection to prevent undesirable electrical discharge (e.g. arcing between components). The air-side (exposed side) of the HVB is an area where evidence of asphalt leaking is likely to be discovered. In the event the seals fail and asphalt leaks from the HVB, it is normally recommended that the HVB be rebuilt or replaced with a new HVB, to protect from hydrogen leakage.

HVB degradation and/or failure can also be indicated by in-service gas loss, in gas-cooled generators. Further, an HVB replacement can be prompted by generator uprating, resulting in the need for higher rated HVBs, or by other factors not associated with degradation, damage, or failure of the HVBs or other electrical components.

An HVB and/or an HVB connection can be repaired and/or replaced by disassembling and reassembling it. Before disassembly, a first winding resistance on each phase can be recorded to obtain baseline data. The disassembly of the HVB connection can be performed by removing insulation and putty between the HVB and the lower stud connector, unbolting the connection between the HVB, the lower stud connector, and a tubular lead, and removing the lower stud connector to free the HVB to be removed.

The tubular lead and the lower stud connector can be visually inspected for overheating and their silver plating integrity. The plating can be restored if desired. Usually, there is no evidence of overheating on the HVB conductor, the lower stud connector, or the tubular lead.

The reassembly of the HVB connection can be performed by the reverse of the disassembly process, except that the lower stud connector bolts can be replaced with new stainless steel hardware. Once the lower stud connector bolts are properly torqued, a second winding resistance can be recorded, and the connection can be re-insulated.

Attempts to repair and/or replace HVBs using current methods have resulted in ensuing failures of the HVBs. These failures have occurred either immediately after the maintenance, or relatively soon thereafter, in a time significantly less than the expected or average life of an HVB. For example, recent failures have surfaced over the past 1 to 3 years with replacement HVB's installed by more than one service provider. In each case, evidence of leaking asphalt was detected during inspections. Accordingly, current industry practices to repair and/or replace HVBs are insufficient in addressing the HVB failure and/or its cause.

In some cases of failure after repair or reassembly of an HVB the winding resistance was recorded, and the results were consistent with past maintenance outage measurements, and in both cases, measurements were consistent between phases. The results would appear to indicate that the HVB connections were acceptable per the industry acceptance criteria e.g., max. of 2% differential between phases when compared to one another). Accordingly, current industry practices to detect HVB connection deficiencies and/or HVB failure causes are insufficient.

It would be advantageous to perform maintenance, repair, or replacement of an HVB to avoid, prevent, or reduce the chance of, an ensuing failure that occurs sooner than the expected life of an HVB.

SUMMARY OF THE INVENTION

The present method provides an improved manner to maintain, repair and/or replace HVBs and/or HVB connections to prevent or reduce ensuing HVB failures.

In one embodiment of the invention, a method of maintaining a high voltage bushing is provided. The method comprises inspecting a high voltage bushing connection, the high voltage bushing connection comprising a tubular lead, a lower stud connector, and the high voltage bushing.

In one aspect of this embodiment, the method comprises restoring at least one of the tubular lead, the lower stud connector, and the high voltage bushing.

In another aspect of this embodiment, the method comprises disassembling the high voltage bushing connection and reassembling the high voltage bushing connection.

In another aspect of this embodiment, inspecting the high voltage bushing connection comprises visually inspecting at least one of a mating portion of the tubular lead, a mating portion of the lower stud connector, and a mating portion of the high voltage bushing.

In another aspect of this embodiment, inspecting the high voltage bushing connection comprises checking a contact surface of at least one of a mating portion of the tubular lead, a mating portion of the lower stud connector, and a mating portion of the high voltage bushing using a bluing agent.

In another aspect of this embodiment, inspecting the high voltage bushing connection comprises measuring diametrical dimensions of at least one of a mating portion of the tubular lead, a mating portion of the lower stud connector, and a mating portion of the high voltage bushing.

In another aspect of this embodiment, restoring at least one of the tubular lead, the lower stud connector, and the high voltage bushing comprises applying conductive material to at least one of a mating portion of the tubular lead and a mating portion of the high voltage bushing, machining an external diameter of at least one of the mating portion of the tubular lead and the mating portion of the high voltage bushing, and machining an internal diameter of at least one of a first mating portion of the lower stud connector and a second mating portion of the lower stud connector.

In another aspect of this embodiment, restoring at least one of the tubular lead, the lower stud connector, and the high voltage bushing further comprises measuring a length from an end of the tubular lead at a mating portion of the tubular lead to an insulation, and removing the insulation from the tubular lead.

In another aspect of this embodiment, restoring at least one of the tubular lead, the lower stud connector, and the high voltage bushing further comprises performing a restoration contact surface check using a bluing agent.

In another aspect of this embodiment, restoring at least one of the tubular lead, the lower stud connector, and the high voltage bushing further comprises silver plating at least a portion of at least one of a mating portion of the tubular lead, a mating portion of the lower stud connector, and a mating portion of the high voltage bushing.

In another aspect of this embodiment, reassembling the high voltage bushing connection comprises performing a post-restoration contact surface check using a bluing agent.

In another embodiment, a method of restoring a high voltage bushing connection is provided. The method comprises applying conductive material to at least one of a mating portion of a tubular lead and a mating portion of a high voltage bushing, machining an outside diameter of at least one of the mating portion of the tubular lead and the mating portion of the high voltage bushing to a predetermined outer diameter, and machining a mating portion of a lower stud connector to a predetermined inner diameter.

In one aspect of this embodiment, the method comprises disassembling the high voltage bushing connection and reassembling the high voltage bushing connection.

In another aspect of this embodiment, the method further comprises performing at least one contact surface area check using a bluing agent.

In another aspect of this embodiment, the method further comprises removing insulation from the tubular lead.

In another aspect or this embodiment, removing insulation from the tubular lead further comprises measuring a length from an end of the tubular lead at a mating portion of the tubular lead to the insulation.

In another aspect of this embodiment, the method further comprises cleaning the lower stud connector to remove putty, epoxies, or contaminants on the external or internal surfaces, the cleaning occurring before the step of machining a tubular lead end of a lower stud connector.

In another aspect of this embodiment, a mandrel is used in place of the high voltage hushing to simulate the mating portion of the high voltage bushing and to perform at least one of the at least one contact surface check.

In another aspect of this embodiment, the method further comprises plating at least one of the mating portion of the lower stud connector, the mating portion of the tubular lead, and the mating portion of the high voltage bushing.

In another embodiment, a high voltage hushing connection of a generator is provided. The high voltage bushing connection comprises a restored mating portion of a tubular connector and a restored lower stud connector. The restored mating portion comprises an added portion of conductive material machined to a final external diameter greater than an initial external diameter with which the tubular connector was previously used in operation with the generator, and the restored lower stud connector comprises a final internal diameter machined to a value larger than an initial internal diameter with which the lower stud connector was previously used in operation with the generator.

DETAILED DESCRIPTION OF THE INVENTION

Figure 1:
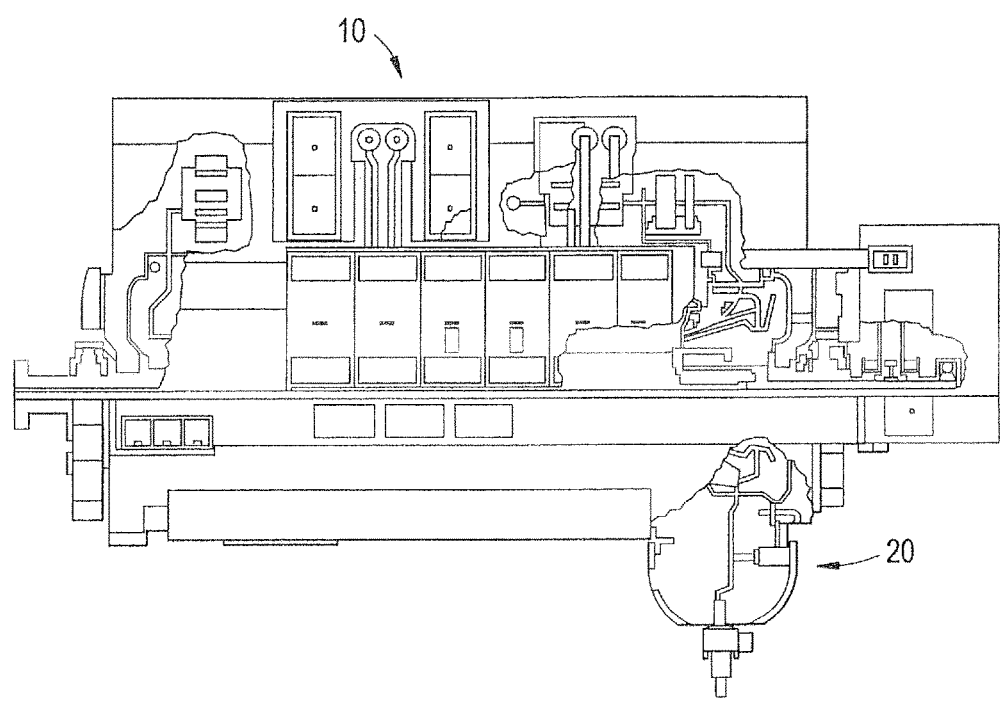
FIG. 1 illustrates a gas-cooled generator, according to one exemplary embodiment.

FIG. 1 illustrates a gas-cooled generator 10, according to one embodiment. The generator 10 has attached a gas-cooled bushing box 20, otherwise called a lower frame extension, under the generator 10.

Figure 2:
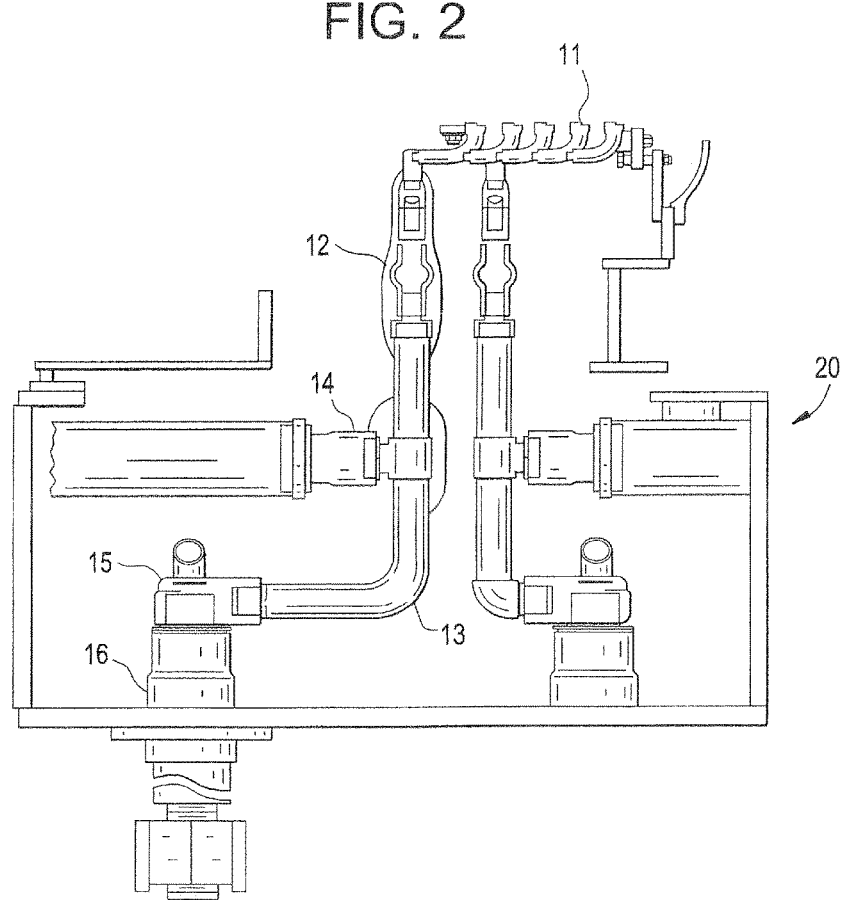
FIG. 2 illustrates the internal components of the bushing box of FIG. 1, according to one exemplary embodiment.

FIG. 2 illustrates the internal components of the bushing box 20. Gas-cooled designs can utilize a large bushing box where access is via a manway in the wall of the box. Inside the bushing box 20, from the top, or side closer to the generator 10, to the bottom, or side farther from the generator 10, the components can comprise connection rings 11, flexible connectors 12, gas-cooled tubular main leads 13 (e.g., a 3.5 or 4.0 inch diameter conductors), gas-cooled stand-off insulators 14, lower stud connectors 15, and gas-cooled HVBs 16 (e.g, 4 inch or 6 inch conductors). Of these components, the electrical current carrying components can include the connection rings 11, the flexible connectors 12, the tubular leads 13, the lower stud connectors 15, and the HVBs 16.

Figure 3:
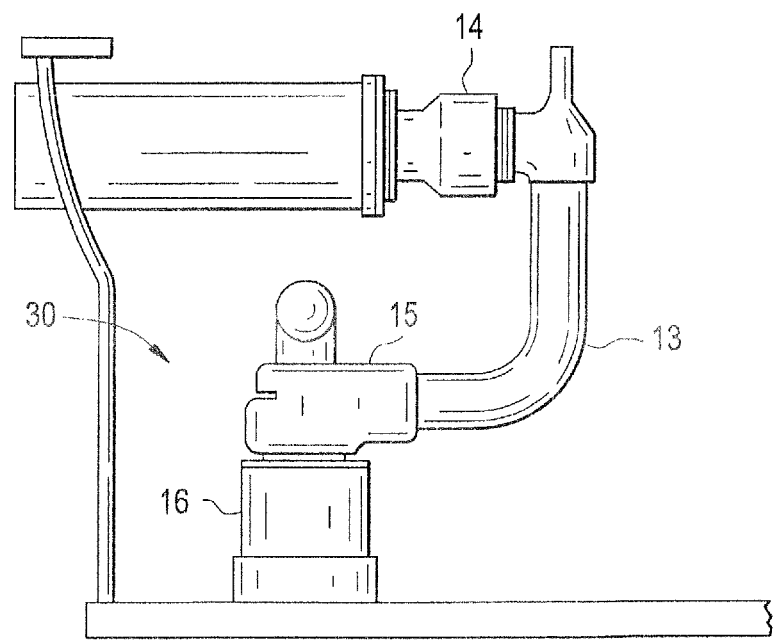
FIG. 3 illustrates an HVB connection 30, according to one exemplary embodiment.

FIG. 3 illustrates an HVB connection 30. The HVB connection comprises a tubular lead 13 connected to a lower stud connector 15, which is connected to an HVB 16. The lower stud connector 15 is a clamshell design that is bolted around an end of the tubular lead 13, and bolted around an end of the HVB 16. Between the stand-off insulator 14 and the tower stud connector 15, the tubular lead 13 is insulated with mica insulation. At the end where the lower stud connector 15 bolts around the tubular lead 13, copper, which composes the hollow tube of the tubular lead 13, is exposed, to mate with the lower stud connector 15.

A comprehensive maintenance program, comprising inspection and repair of the HVB connection 30, can be implemented to maintain reliability of the high voltage hushing and associated components. By utilizing a specialized inspection process, the electrical contact surfaces can be evaluated, and repairs can be performed to re-establish proper electrical surface contact, which can minimize the possibility of a high-resistance joint leading to a high voltage bushing failure.

The exemplary method of maintenance can involve disassembling the HVB connection 30, inspecting the HVB connection 30, restoring the tubular lead 13, the HVB 16, and/or the lower stud connector 15, and reassembling the HVB connection 30. Lead times to procure new replacement parts can be prohibitive to ordering new parts, from a production and operation standpoint.

Figure 4:
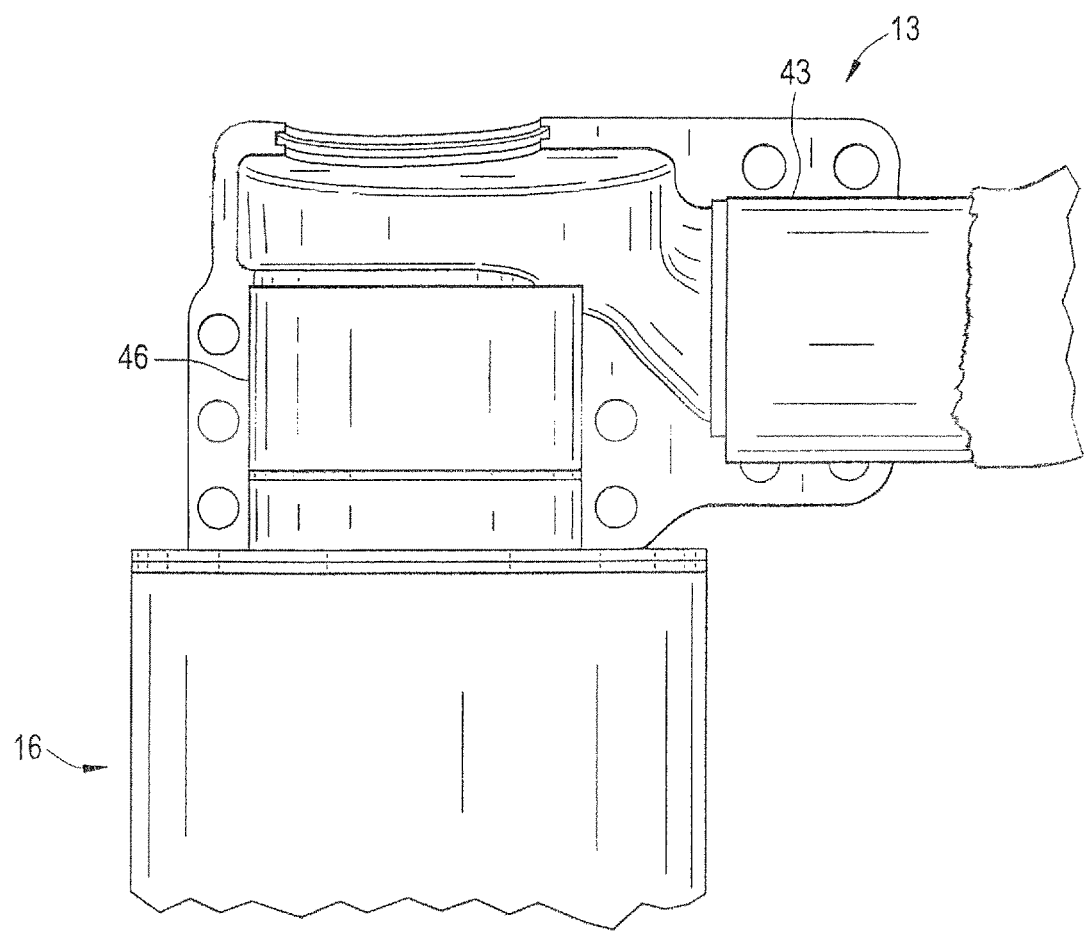
FIG. 4 illustrates a tubular lead with the lower stud connector disassembled.
Figure 5:
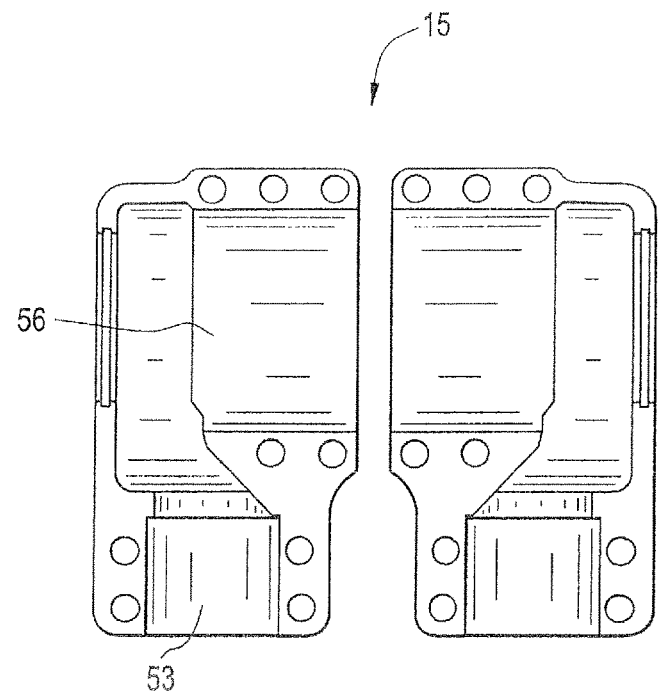
FIG. 5 illustrates a disassembled lower stud connector.

The lower stud connector 15 can be disassembled from the HVB 16 and the tubular lead 13. FIG. 4 illustrates the disassembled tubular lead 13 and HVB 16, and FIG. 5 illustrates the disassembled lower stud connector 15. Removing the lower stud connector reveals a mating portion 43 of the tubular lead, and a mating portion 46 of HVB 16. A first mating portion 53 of the lower stud connector 15 which mates with the tubular lead 13, and a second mating portion 56 of the loner stud connector 15, which mates with the HVB 16, are also revealed.

An exemplary method of maintenance can comprise inspecting the HVB connection 30. A visual inspection of the conductor mating surfaces can be conducted. During the visual inspection, any cracks, electrical pitting, or other deformities or damage can be noted and/or recorded. These cracks, pitting, or other deformities or damage can be later repaired.

Following the visual inspection, a contact surface check using a bluing agent (e.g., machinist's blue, otherwise known as engineer's blue), such as Hi-Spot Blue, can be performed. A contact surface check can be performed by spreading the bluing agent on the contact surface of one component, and assembling and disassembling the second component with/from the first component. The bluing agent that transfers between the two components can reveal the portions of the two components that mated. Surface incongruences between two mating surfaces and high spots can be detected. Contact surface checks using a bluing agent have not been performed as normal industry installation practices for HVB replacement projects. During the contact surface check, a proper torque on the lower stud connector 15 can be applied in order to facilitate a proper determination or contact surface area mating. A proper torque can be determined by, for example, the generator manufacturer's specifications or industry standards.

A dimensional check can also be performed to verify the diametrical dimensions (e.g., 4 point check) on the mating portion 43 of the tubular lead 13, where the lower stud connector 15 connects to the tubular lead 13, and on the mating portion 46 of the HVB 16, where the lower stud connector 15 connects to the HVB 16. Dimensions can be recorded at the end or up to approximately ½ inch from the end of the tubular lead 13. The dimensional check can be repeated by dividing the remaining length of the mating portion 43 into meaningful increments to determine its "roundness". Similarly, the dimensions on the mating portion 46 of the HVB 16 can be recorded at the end or up to approximately ½ inch from the end of the HVB 16, repeating the dimensional check by dividing the remaining length of the mating portion 46 into meaningful increments. Dimensional checks can also be performed on the first mating portion 53 and the second mating portion 56 of the lower stud connector 15.

Investigating HVBs replaced by service providers that consequently failed found that mating components in each HVB revealed a potentially high resistance connection in-service between the tubular lead 13 and the lower stud connector 15. The contact surface checks using a bluing agent revealed insufficient contact surface area between the tubular lead 13 and the lower stud connector 15. In addition, diametrical dimensional checks performed along the axial length of the tubular connection revealed deformation (out of roundness) of the copper material making up the conductive components. The insufficient surface contact can increase electrical resistance, increase heat, and cause or promote failure of the HVB 16.

The "roundness", or contact surface of the mating portion 43 of the tubular lead 13 and the first mating portion 53 of the lower stud connector 15 can be restored to achieve acceptable or desirable contact surface area between the tubular lead 13 and the lower stud connector 15.

To restore the contact surfaces, the length of the end of the tubular lead 13, including the mating portion 43 of the tubular lead 13, up to the beginning of the mica-insulation, can be measured and recorded. The existing mica-insulation can then be entirely stripped off the tubular lead 13. The measured/recorded length of the exposed copper portion of the tubular lead 13 can be used to re-establish the insulation termination when the tubular lead is later re-insulated.

Figure 6:
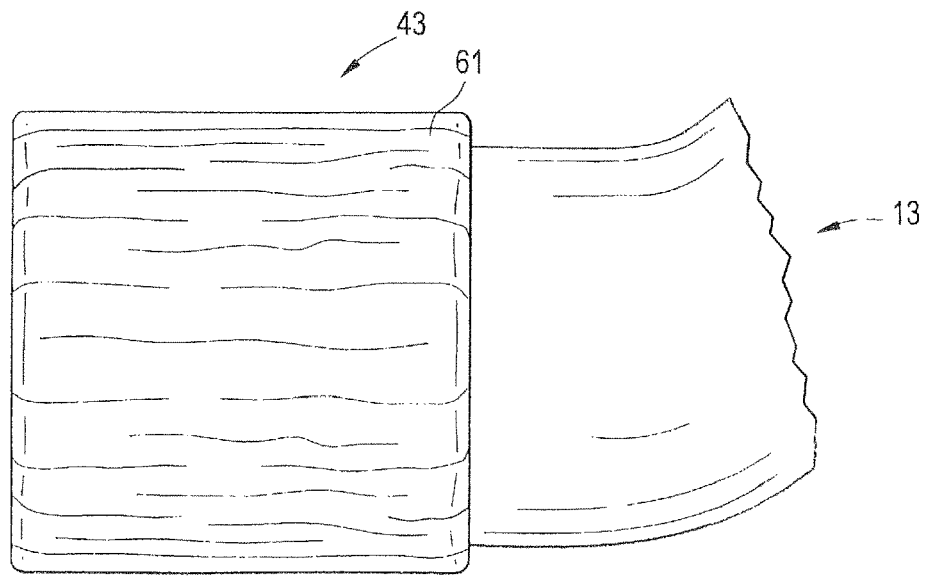
FIG. 6 illustrates a tubular lead with mica-insulation entirely removed, and with applied copper incorporated to build out a mating portion, according to one exemplary embodiment.
Figure 7:
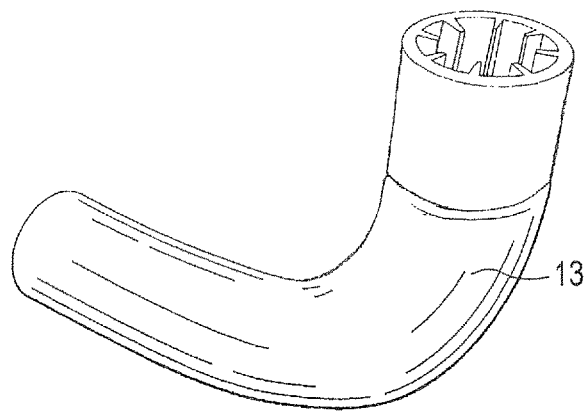
FIG. 7 illustrates a mating portion of the tubular lead machined to a uniform, round surface at a desired diameter, according to one embodiment.

After stripping the mica-insulation, copper build material can be applied on the mating portion 43 of the tubular lead 13. The copper can be applied via any known method, such as via a TIG welding, process. FIG. 6 illustrates the tubular lead 13 with the mica-insulation entirely removed, and with applied copper 61 incorporated to build out the mating portion 43. The mating portion 43 of the tubular lead can be machined to a uniform, round surface at a desired diameter, as illustrated in FIG. 7.

Figure 8:
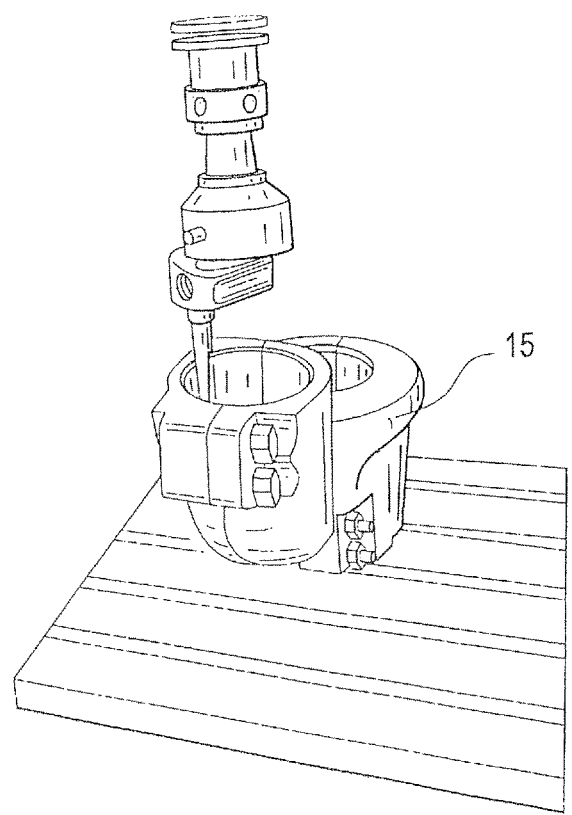
FIG. 8 illustrates a lower stud connector being machined, according to one embodiment.

The lower stud connector 15 can undergo similar treatment to restore its contact surface. First, both halves of the lower stud connector 15 can be cleaned to remove any conforming putties, epoxies, or contaminants remaining on the external or internal surfaces. Glass bead cleaning, or any known cleaning method, can be performed. Then the first mating portion 53 of the lower stud connector 15 can be machined to a desirable internal diameter for connection with the mating portion 43 of the tubular lead 13. FIG. 8 illustrates the lower stud connector 15 being machined. To allow the components to be repaired at a location remote from the generator 10, and to allow the HVB 16 to remain on site with the generator 10, an assembly for machining can be arranged using a temporary conductor on the HVB side of the lower stud connector 15.

After the tubular lead 13 and the lower stud connector 15 are machined, the parts can be checked to ensure dim have all adequate amount of contact surface engagement. A restoration contact surface check using a bluing agent, between the newly machined tubular lead 13 and the lower stud connector 15, can be performed. Again, to allow the components to be repaired remotely, a specified diameter mandrel can be used to simulate the HVB conductor. A repaired tubular lead 13 and lower stud connector 15 can have a minimum amount of contact surface engagement, as determined in each case by the generator type, the generator requirements, the electrical load, the generator manufacturer specifications, industry standards, and/or a variety of other factors. An acceptably repaired tubular lead 13 and lower stud connector 15, for example, might have, at minimum, 2.5 inches length of engagement of the tubular lead 13 into the lower stud connector 15 and 50% or greater surface contact at the mating areas.

Following an acceptable restoration contact surface check using a bluing agent, the tubular lead 13 and the lower stud connector 15 can be silver plated (e.g., 0.0005-0.002 inch thickness). Silver plating can be applied to both ends of the tubular lead 13. The plating on the mating portion 43 of the tubular lead 13 should be at least the length of engagement between the tubular lead 13 and the lower stud connector 15. After the silver plating process, the tubular lead 13 can be re-insulated. The insulation build depends, at least in part, on the voltage of the generator.

The "roundness", or contact surface of the mating portion 46 of the HVB 16 and the second mating portion 56 of the lower stud connector 15 can also be restored to achieve acceptable or desirable contact surface area between the HVB and the lower stud connector 15, if the contact surface area between the HVB 16 and the lower stud connector 15 is unacceptable or otherwise insufficient.

As with the tubular lead 13, copper build material can be applied on the mating portion 46 of the HVB 16. The copper can be applied via any known method, such as via a TIG welding process. The mating portion 46 of the HVB 16 can be machined to a uniform, round surface at a desired diameter.

The second mating portion 56 of the lower stud connector 15 can be machined to a desirable internal diameter for connection with the mating portion 46 of the HVB 16.

After the mating portion 46 of the HVB 16 and the lower stud connector 15 are machined, the parts can be checked to ensure they have an adequate amount of contact surface engagement. A second restoration contact surface check using a bluing agent, between the newly machined HVB 16 and the lower stud connector 15, can be performed. As with the connection between the tubular lead 13 and the lower stud connector 15, a repaired HVB 16 and lower stud connector 15 can have a minimum amount of contact surface engagement, as determined in each case by the generator type, the generator requirements, the electrical load, the generator manufacturer specifications, industry standards, and/or a variety of other factors.

Following an acceptable second restoration contact surface check using a bluing agent, the mating portion 46 of the HVB 16 and the second mating portion 56 of the lower stud connector 15 can be silver plated (e.g., 0.0005-0.002" thickness). The plating on the mating portion 46 of the HVB 16 should be at least the length of engagement between the HVB 16 and the lower stud connector 15. If the mating portion 46 of the HVB 16 is restored, the silver plating process can be performed on the HVB 16, the tubular lead 13, and the lower stud connector 15 after the machining of each of the tubular lead 13, the lower stud connector 15, and the HVB 16.

The exemplary method comprises reassembling the HVB connection components. During reassembly, the HVB connection components can be reinstalled in the generator and a post-restoration contact surface check using a bluing agent can be performed with all the components assembled in their operating positions. With this post-restoration contact surface check, the desired minimum amount of contact surface engagement can be verified.

The implementation of this maintenance method in the field during routine maintenance and/or during forced outages of generators has resulted in increased service lives of HVBs in-service.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in art. Such other examples are intended to be within the scope of the claims if they have structural elements that do not differ from the literal language of the claims, or if they include equivalent structural elements with insubstantial differences from the literal language of the claims.

We claim:

1. A method of restoring a high voltage connection, the method comprising:
   applying conductive build material to a mating portion of a lead by a welding process,
   machining the conductive build material applied to the mating portion of the lead to remove a portion of the conductive build material from the mating portion of the lead, said machining the conductive build material applied to the mating portion of the lead providing an external diameter of the mating portion of the lead,
   machining a first mating portion of a stud connector, said machining the first mating portion of the stud connector providing an internal diameter of the first mating portion of the stud connector, and
   positioning the mating portion of the lead relative to the first mating portion of the stud connector such that the internal diameter of the first mating portion of the stud connector is around the external diameter of the mating portion of the lead.

2. The method as recited in claim 1, wherein the stud connector further comprises a second mating portion which has a stud connector second mating portion internal diameter positioned around a high voltage bushing connection, and the method further comprises:
   disassembling the high voltage bushing connection; and
   reassembling the high voltage bushing connection.

3. The method as recited in claim 1, wherein the method further comprises applying a contact surface checking agent to the mating portion of the lead or to first mating portion of the stud connector.

4. The method as recited in claim 3, wherein the contact surface checking agent comprises at least one bluing agent.

5. The method as recited in claim 1, wherein the method further comprises removing insulation from the lead.

6. The method as recited in claim 5, wherein removing insulation from the lead further comprises measuring a length from an end of the lead at the mating portion of the lead to the insulation.

7. The method as recited in claim 1, wherein the method further comprises cleaning the stud connector to remove putty, epoxies, or contaminants on the external or internal surfaces, said cleaning occurring before the step of machining the first mating portion of the stud connector.

8. The method as recited in claim 1, wherein the method further comprises applying a contact checking agent (1) to a second mating portion of the stud connector or (2) to at least a portion of a mandrel, and then mating the second mating portion of the stud connector with the mandrel.

9. The method as recited in claim 1, wherein the method further comprises after said applying conductive build material and after said machining, silver plating at least some of the conductive build material remaining after said machining.

10. The method as recited in claim 1, wherein the lead is a tubular lead.

11. The method as recited in claim 1, wherein the method further comprises measuring dimensions of the mating portion of the lead and the first mating portion of the stud connector.

12. The method as recited in claim 11, wherein the method further comprises comparing a shape of the mating portion of the lead to a comparison shape.

13. The method as recited in claim 12, wherein the comparison shape is a cylindrical shape.

14. The method as recited in claim 1, wherein the high voltage connection conducts electric current that is going from a stator winding connection of a generator through a frame of the generator to a buss external to the generator.

15. The method as recited in claim 14, wherein current from the stator winding connection flows through the lead and the stud connector as it goes from the stator winding connection to a high voltage bushing.

16. The method as recited in claim 15, wherein the lead and the high voltage bushing are gas-cooled.

17. A method of restoring a high voltage bushing connection, the method comprising:
   applying conductive build material by a welding process to a mating portion of a lead in a high voltage bushing connection that comprises the lead, a stud connector and a high voltage bushing,
   machining the conductive build material applied to the mating portion of the lead to remove a portion of the conductive build material that was applied to the mating portion of the lead, said machining the conductive build material applied to the mating portion of the lead providing an external diameter of the mating portion of the lead,
   machining a first mating portion of a stud connector, said machining the first mating portion of the stud connector providing an internal diameter of the first mating portion of the stud connector, and
   positioning the mating portion of the lead relative to the first mating portion of the stud connector such that the internal diameter of the first mating portion of the stud connector is around the external diameter of the mating portion of the lead.

18. The method as recited in claim 17, wherein the high voltage bushing conducts electric current from a stator winding connection of a generator through a frame of the generator to a buss external to the generator.

19. The method as recited in claim 18, wherein current from the stator winding connection passes through the lead and the stud connector as it goes from the stator winding connection to the high voltage bushing.

20. A The method as recited in claim 19, wherein the lead and the high voltage bushing are gas-cooled.

\* \* \* \* \*